United States Patent
Dahm et al.

(10) Patent No.: US 9,530,594 B2
(45) Date of Patent: Dec. 27, 2016

(54) INTEGRATED PARTICLE TRAP IN A TANK OF A DEAD TANK CIRCUIT BREAKER

(71) Applicant: ABB Technology AG, Zurich (CH)

(72) Inventors: Elizabeth L. Dahm, Pittsburgh, PA (US); Jonathan M. Fuge, Farmington, PA (US); Matthew D. Cuppett, Uniontown, PA (US); Mauricio Aristizabal, Pittsburgh, PA (US)

(73) Assignee: ABB SCHWEIZ AG, Baden (CH)

( * ) Notice: Subject to any disclaimer, the term of this patent is extended or adjusted under 35 U.S.C. 154(b) by 97 days.

(21) Appl. No.: 14/260,777

(22) Filed: Apr. 24, 2014

(65) Prior Publication Data

US 2015/0311016 A1 Oct. 29, 2015

(51) Int. Cl.
*H01H 33/56* (2006.01)
*H02B 13/045* (2006.01)
*H02G 5/06* (2006.01)

(52) U.S. Cl.
CPC ............ *H01H 33/56* (2013.01); *H02B 13/045* (2013.01); *H02G 5/065* (2013.01)

(58) Field of Classification Search
CPC .. H01H 2223/002; H01H 33/30; H01H 33/91; H01H 9/30; H01H 9/52
See application file for complete search history.

(56) References Cited

U.S. PATENT DOCUMENTS

| | | | | |
|---|---|---|---|---|
| 1,921,447 A * | 8/1933 | Barnett | ................... | H01R 24/28 174/138 F |
| 1,978,591 A * | 10/1934 | Meiwald | ................... | A43D 1/02 174/113 C |
| 2,189,987 A * | 2/1940 | Kellems | ................... | H01R 13/562 138/109 |
| 2,532,135 A * | 11/1950 | Whyland | ................... | H01B 3/30 174/113 R |
| 2,936,257 A * | 5/1960 | Nailler | ................... | H01R 9/03 156/160 |
| 3,240,867 A * | 3/1966 | Maddox | ................... | H01B 7/065 174/109 |
| 5,605,473 A * | 2/1997 | Kishon | ................... | G06F 1/18 361/679.4 |
| 6,224,627 B1 * | 5/2001 | Armstrong | ................... | A61F 2/82 623/1.13 |
| 6,307,172 B1 * | 10/2001 | Bolin | ................... | H01H 33/56 174/16.2 |

(Continued)

FOREIGN PATENT DOCUMENTS

JP           62-57511         *  4/1987

*Primary Examiner* — Truc Nguyen
(74) *Attorney, Agent, or Firm* — Manelli Selter PLLC; Edward J. Stemberger

(57) ABSTRACT

A tank for a dead tank circuit breaker includes a body having an interior volume defined by an interior surface. A particle trap structure includes a pair of recessed surfaces in a bottom portion of the interior surface. Each recessed surface is disposed in spaced relation with respect to the interior surface so as to define a channel. A raised surface is spaced from the recessed surfaces and separates the recessed surfaces. The channels are constructed and arranged to trap foreign particles in the interior volume, with the raised surface being constructed and arranged to raise an electric field in the interior volume to be above the channels so as to eliminate electrical activity that would affect the particles in the channels.

8 Claims, 2 Drawing Sheets

(56) References Cited

U.S. PATENT DOCUMENTS

| | | | | |
|---|---|---|---|---|
| 6,406,313 B1* | 6/2002 | Victor | ............... | H01R 27/00 |
| | | | | 439/175 |
| 8,029,302 B1* | 10/2011 | Duan | ............... | H01R 13/60 |
| | | | | 439/142 |
| 8,160,719 B2* | 4/2012 | Swoyer | ............... | A61N 1/05 |
| | | | | 607/116 |

* cited by examiner

INTEGRATED PARTICLE TRAP IN A TANK OF A DEAD TANK CIRCUIT BREAKER

FIELD

The invention relates to high voltage dead tank circuit breakers and, more particularly, to particle traps for collecting foreign material in a tank of the circuit breaker.

BACKGROUND

Dead tank circuit breakers are commonly found in substations and are operable to selectively open and close electrical connections contained within a sealed tank filled with dielectric material for reducing arcing.

Despite careful manufacturing practices, an assembled circuit breaker can contain undesirable foreign particles such as metal shavings from machined parts, dirt, etc. It is undesirable for these particles, especially metallic, electrically conductive particles to reside in the tank since, if such particles are permitted to remain free in the tank, they could cause undue arcing, flashing, or can be electrically charged and radially reciprocate within the tank, reducing the breakdown voltage of the circuit breaker.

Particle traps have been developed for trapping these foreign particles. Conventional particle traps are configured in two ways: external and integrated. External particle traps are components that are fixed to the tank in some manner to shield particles in the bottom of the tank from the electric field. Integrated particle traps are a cast feature and typically includes a single trough (running radially), a single cup, or single trough (running lengthwise of the tank) used to catch particles.

Cups and troughs are susceptible to the electrical field reaching into the protected area and generating activity. A trough running with the tank length can always permit the electric field to enter. There are ways to avoid the field from entering the cup and the radial trough, such as making the depth significantly deeper than the width. This is not possible on some dead tank circuit breakers due to height restrictions. Therefore, another method is to minimize the width of the trap such that the depth to width ratio is optimized. However, this method leads to a greater probability of particles not entering the integrated trap.

Thus, there is a need to provide particle trap structure in a tank of a dead tank circuit breaker that allows for a large catch width while reduces the need for depth, which reduces the cost of the particle trap and increases performance by catching more particles without increasing tank diameter.

SUMMARY

An object of the invention is to fulfill the need referred to above. In accordance with the principles of the present invention, this objective is obtained by providing a tank for a dead tank circuit breaker. The tank includes a body having an interior volume defined by an interior surface. A particle trap structure includes a pair of recessed surfaces in a bottom portion of the interior surface. Each recessed surface is disposed in spaced relation with respect to the interior surface so as to define a channel. A raised surface is spaced from the recessed surfaces and separates the recessed surfaces. The channels are constructed and arranged to trap foreign particles in the interior volume, with the raised surface being constructed and arranged to raise an electric field in the interior volume to be above the channels so as to eliminate electrical activity that would affect the particles in the channels.

In accordance with another aspect of an embodiment, particle trap structure for collecting particles in a tank of a dead tank circuit breaker is provided. The tank includes an interior volume defined by an interior surface. The particle trap structure includes a pair of recessed surfaces in a bottom portion of the interior surface. Each recessed surface is disposed in spaced relation with respect to the interior surface so as to define an elongated channel. An elongated, raised surface is spaced from the recessed surfaces and separates the recessed surfaces. The channels are constructed and arranged to trap foreign particles in the interior volume, with the raised surface being constructed and arranged to raise an electric field in the interior volume to be above the channels so as to eliminate electrical activity that would affect the particles in the channels.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXEMPLARY EMBODIMENT

Figure 1:
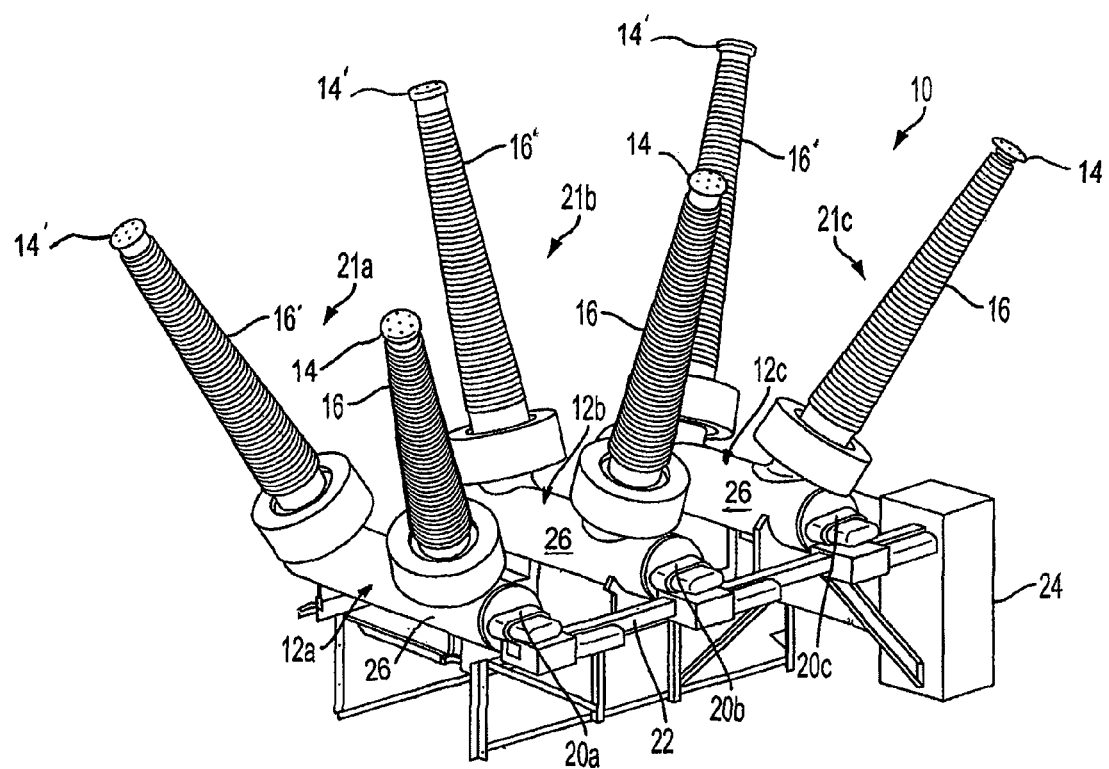
FIG. 1 is a front perspective view of a high voltage dead tank circuit breaker in accordance with an embodiment.

With reference to FIG. 1, a dead tank circuit breaker is shown, generally indicated at 10, in accordance with an embodiment. Circuit breaker 10 is a preferably a three phase circuit breaker, and thus includes three pole assemblies including outer pole assemblies 12a and 12c and a central pole assembly 12b. Each pole assembly includes a first electrical conductor 14 carried in a first bushing 16 and a second electrical conductor 14' carried in a second bushing 16'. As is known in the art, electrical power lines are coupled to the first and second electrical conductors, and the circuit breaker 10 selectively opens or closes the electrical connection there-between. A bell crank 20a, 20b, 20c, is associated with a respective pole assembly 12a, 12b and 12c. The bell cranks are interconnected by a gang-style linkage structure 22 including interconnecting shafts 23 so that all three poles assemblies are actuated at the same time by a single operating mechanism, generally indicated at 24. Each pole assembly 12a, 12b and 12c includes a tank 26 having a body 27 that houses the electrical contacts of the breaker 10. The interior volume 28 of each tank 26 may be filled with dielectric material 29 (FIG. 2) that preferably includes SF6, dry air, dry nitrogen, $CO_2$ or oil to reduce arcing. The circuit breaker 10 of FIG. 1 is an example of a dead tank circuit breaker and instead of providing the gang-style linkage structure 22, the poles assemblies 12a, 12b and 12c can be independently operated. Also, the tanks 26 of pole assemblies 12a and 12c need not be rotated.

Figure 2:
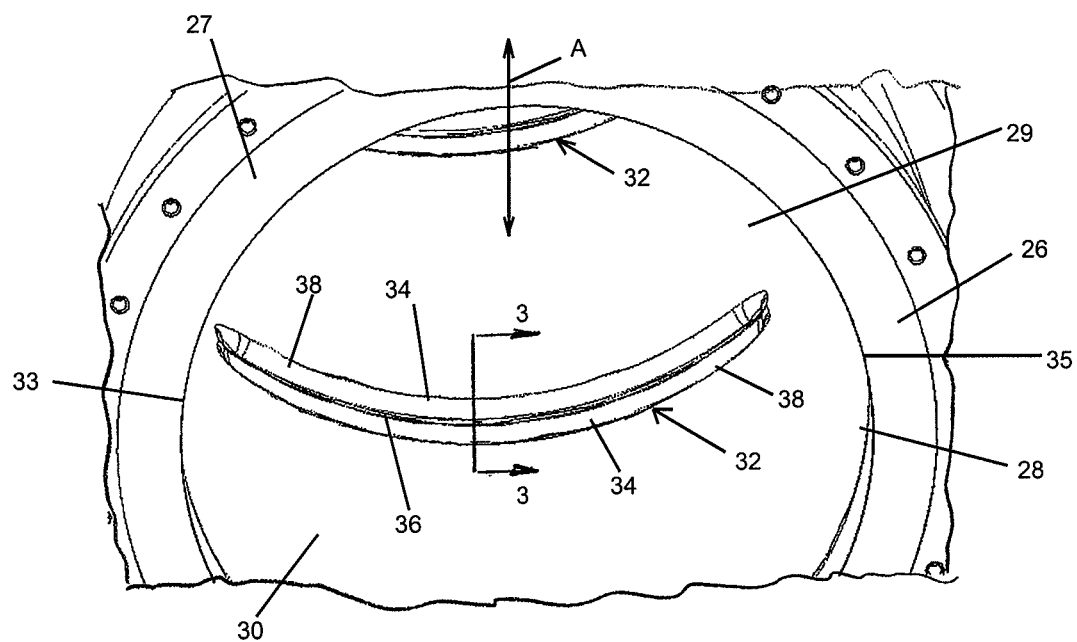
FIG. 2 is a front view of a tank of the dead tank circuit breaker of FIG. 1, showing particle trap structure in an interior surface thereof.

With reference to FIG. 2, a portion of the interior volume 28 of body 27 of a tank 26 is shown after removal of a bell crank 20a (FIG. 1). The interior volume 28 is generally cylindrical defined by an annular interior surface 30. Particle trap structure, generally indicted at 32 is provided in a bottom portion of the surface 30 so as to collect foreign particles in the tank 26 that may fall into the trap structure 32 due to gravity. The trap structure 32 extends radially of the tank 26, generally from one side 33 to the opposite side 35 of the tank 26.

Figure 3:
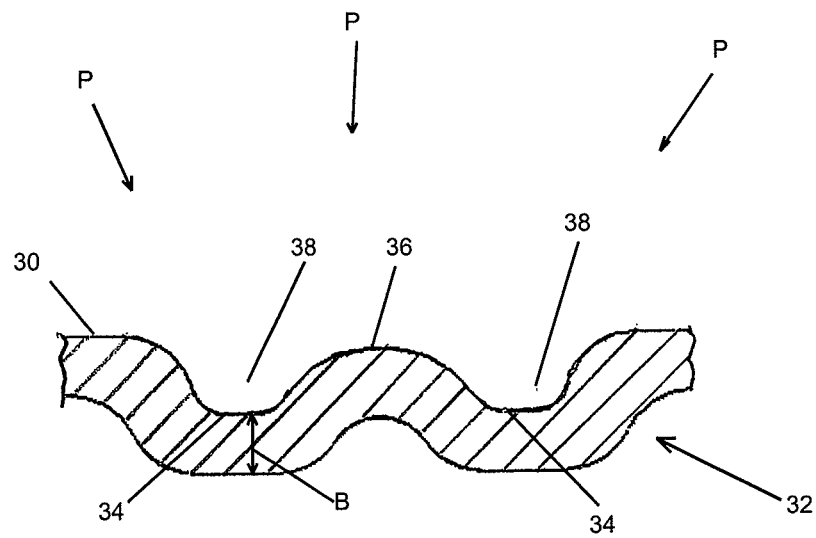
FIG. 3 is a cross-sectional view of the trap structure taken along the line 3-3 in FIG. 2.

FIG. 3 shows a cross-section of the trap structure taken along the line 3-3 in FIG. 2. In the embodiment, the trap structure 32 is preferably of undulating shape having a pair of recessed surfaces 34 separated by an elongated surface 36 that is raised or spaced from the recessed surfaces 34. Each recessed surface 34 is disposed in spaced relation with respect to the bottom surface 30 (e.g., is lower than surface 30) so as to define an elongated channel 38. The rounded, raised surface 36 is preferably on the same level as surface 30. The trap structure 32 allows for a large particle catch width while reducing the need for substantial depth of channels 38. In the embodiment, the trap structure 32 is 80° around the bottom surface 30 of the tank 26. The depth of the trap structure 32 is about 23 mm, compared to an internal tank diameter of 850 mm. Each trap structure 32 is about 140 mm wide compared to an overall tank length of 3783 mm.

With reference to FIG. 3, particles, represented by arrows P, have a natural tendency to fall to the lowest point, which would be into the protected channels 38. The raised surface 36 in the middle of the channels 38 effectively raises the electric field in the interior volume 28 to be above the protected channels 38 and eliminates electrical activity that would affect the particles in the channels 38.

Since the trap structure extends radially, it works well with the dead tank circuit breaker 10 that has outer poles 12a, 12c rotated relative to the center pole 12b, since the same trap structure 32 configuration works in all three positions of the tanks 26, without the need for different tank variants. In long tanks 26, as shown in FIG. 2, a plurality one or more additional trap structures 32 can be provided so that pairs of trap structures 32 are in spaced relation with respect to a longitudinal axis A of the tank 26. As shown in FIG. 2, the trap structure 32 is integral with the body 27 and is formed to maintain a generally constant wall thickness B of the body 27.

The trap structure 32 of the embodiment allows for a large particle catch width while reduces the need for depth, which reduces the cost of particle traps and increases performance by catching more particles without increasing tank diameter The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A tank for a dead tank circuit breaker, the tank comprising:
   a body having an interior volume defined by an interior surface,
   a particle trap structure comprising:
      a pair of recessed surfaces that are part of and disposed in a bottom portion of the interior surface, each recessed surface being disposed in spaced relation with respect to the interior surface so as to define a channel, and
      a raised surface that is part of the interior surface and is spaced from the recessed surfaces and separates the recessed surfaces,
   wherein the channels are constructed and arranged to trap foreign particles in the interior volume, with the raised surface being constructed and arranged to raise an electric field in the interior volume to be above the channels so as to eliminate electrical activity that would affect the particles in the channels,
   wherein the raised surface is located generally at a level that is the same as that of the interior surface;
   wherein the particle trap structure extends radially of the tank.

2. The tank of claim 1, wherein a depth of the trap structure is about 23mm and a width of the trap structure is about 140 mm.

3. The tank of claim 1, wherein the interior surface is annular and the trap structure extends generally extends generally from one side to an opposing side of the tank.

4. The tank of claim 1, further comprising at least another trap structure so as to define a pair of trap structures disposed in spaced relation with respect to a longitudinal axis of the tank.

5. The tank of claim 1, wherein the trap structure is formed with the body so as to maintain a generally constant wall thickness of the tank.

6. The tank of claim 1, further comprising a dielectric material in the interior volume.

7. The tank of claim 1, wherein the channels and the raised surface are each elongated.

8. The tank of claim 1, in combination with two other tanks defining three pole assemblies of a dead tank circuit breaker including two outer pole assemblies and a central pole assembly, with each tank being substantially identical.

* * * * *